United States Patent
Agombar et al.

(10) Patent No.: US 7,676,641 B2
(45) Date of Patent: Mar. 9, 2010

(54) STORAGE SYSTEM WITH MULTIPLE COPY TARGETING AND DISK FAILURE PROTECTION

(75) Inventors: John P. Agombar, Winchester (GB); Christopher B. E. Beeken, Eastleigh (GB); Carlos F. Fuente, Portsmouth (GB); Simon Walsh, Hayling Island (GB)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 12/047,464

(22) Filed: Mar. 13, 2008

(65) Prior Publication Data
US 2008/0215837 A1 Sep. 4, 2008

Related U.S. Application Data

(63) Continuation of application No. 11/287,735, filed on Nov. 28, 2005, now Pat. No. 7,360,048.

(30) Foreign Application Priority Data
Dec. 23, 2004 (GB) .................................. 0428105.1

(51) Int. Cl.
G06F 12/16 (2006.01)
(52) U.S. Cl. .................... 711/162; 711/161; 707/204

(58) Field of Classification Search ................ 711/161, 711/162, 165; 707/204
See application file for complete search history.

(56) References Cited

U.S. PATENT DOCUMENTS

| 6,820,180 B2 | 11/2004 | McBrearty et al. |
| 7,165,141 B2 | 1/2007 | Cochran et al. |
| 7,360,048 B2 * | 4/2008 | Agombar et al. ............ 711/162 |

* cited by examiner

*Primary Examiner*—Jack A Lane
(74) *Attorney, Agent, or Firm*—Lieberman & Brandsdorfer, LLC

(57) ABSTRACT

An apparatus is disclosed in which a storage controller cooperable with a host and a plurality of controlled storage is provided to localize an impact of a failure to a target disk in an affected segment. The storage controller includes a host write component to write a data object to a source image storage; a first copy component responsive to a first metadata state to control copying of the data object to a first target storage; a second copy component responsive to a second metadata state to perform either: copying the data object to a second target or causing the first copy component to copy the second target to the first target; and a third copy component to control cascaded copying of the data object to a third target storage. Either the second or the third copy component controls cascaded copying of a delimited data image subsequence responsive to a metadata state indicating currency of a data grain in either the second or the third target.

16 Claims, 9 Drawing Sheets

STORAGE SYSTEM WITH MULTIPLE COPY TARGETING AND DISK FAILURE PROTECTION

CROSS REFERENCE TO RELATED APPLICATION(S)

This application is a continuation of application Ser. No. 11/287,735, filed on Nov. 28, 2005, now pending, which is hereby incorporated herein by reference, and which claims the benefit of foreign application number 0428105.1, filed on Dec. 23, 2004 in Great Britain.

FIELD OF THE INVENTION

The present invention relates to the field of computer storage systems, and particularly to advanced function storage systems providing a FlashCopy®, a registered trademark of International Business Machines Corporation function or the equivalent.

BACKGROUND OF THE INVENTION

In the field of computer storage systems, there is increasing demand for what have come to be described as "advanced functions". Such functions go beyond the simple I/O functions of conventional storage controller systems. Advanced functions are well known in the art and depend on the control of metadata used to retain state data about the real or "user" data stored in the system. The manipulations available using advanced functions enable various actions to be applied quickly to virtual images of data, while leaving the real data available for use by user applications. One such well-known advanced function is FlashCopy.

At the highest level, FlashCopy is a function where a second image of 'some data' is made available. This function is sometimes known in other system contexts as Point-In-Time copy, or T0-copy. The second image's contents are initially identical to that of the first. The second image is made available 'instantly'. In practical terms this means that the second image is made available in much less time than would be required to create a true, separate, physical copy, and that this means that it can be established without unacceptable disruption to a using application's operation.

Once established, the second copy can be used for a number of purposes including performing backups, system trials and data mining. The first copy continues to be used for its original purpose by the original using application. Contrast this with backup without FlashCopy, where the application must be shut down, and the backup taken, before the application can be restarted again. It is becoming increasingly difficult to find time windows where an application is sufficiently idle to be shut down. The cost of taking a backup is increasing. There is thus significant and increasing business value in the ability of FlashCopy to allow backups to be taken without stopping the business.

FlashCopy implementations achieve the illusion of the existence of a second image by redirecting read I/O addressed to the second image (henceforth Target) to the original image (henceforth Source), unless that region has been subject to a write. Where a region has been the subject of a write (to either Source or Target), then to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique is well known and is used in many environments.

All implementations of FlashCopy rely on a data structure which governs the decisions discussed above, namely, the decision as to whether reads received at the Target are issued to the Source or the Target, and the decision as to whether a write must be suspended to allow the copy-on-write to take place. The data structure essentially tracks the regions or grains of data that have been copied from source to target, as distinct from those that have not. In its simplest form, this data structure is maintained in the form of a bitmap showing which grains have been written to, and which are untouched by write activity.

Some storage controllers allow a user to configure more than one target for a given source. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus.

Existing implementations of multiple target FlashCopy extend the FlashCopy algorithm, by configuring the disks as shown in FIG. 1, where A is a source LOGICAL UNIT, and B and C show two targets that were taken at some time in the past. A, B and C can each be updated. The arrows show grains (fixed sized regions of the disk) which are still dependent on the source LOGICAL UNIT. These have corresponding bits of '0b' in the bitmap which tracks the progress of each Flash-Copy.

This conventional algorithm simply arranges the multiple targets in parallel, and operates the original FlashCopy algorithm over each mapping in turn.

This has a drawback in that writes to a grain in the source might split multiple grains (one in each relationship). The last grain in the above example would be one. This causes extra processing and latency, and may limit the scalability of the multiple FlashCopy arrangement, and hence its usability.

It is possible to provide an arrangement in which a storage controller, a logic arrangement in a storage controller, or software operating in an operating system structures the FlashCopy mappings in a cascade and then functions to ensure that the number of writes needed for any host I/O is bounded at 2, regardless of the number of target disks in the cascade.

However, such an arrangement does not allow for the situation in which a set of cascade relationships is broken by a disk failure somewhere in the cascade.

Thus, one respect in which cascaded FlashCopy targets are inferior to the conventional scheme is that the data on a cascaded target is dependent on all the disks above it—not just the source as in the conventional scheme.

This is not a concern if the principal cause of data loss is system corruption, e.g. through virus, accidental deletion, etc. It may be a concern if the principle cause is the failure of disks, in particular where a very long chain of disks is connected. Since it is possible to construct cascaded structures involving possibly thousands of disks in a chain, the risk of data loss can escalate appreciably with each layer of cascading in the structure.

If the source disk becomes inaccessible it is reasonable to expect the target disks to become inaccessible. However, if a target disk becomes inaccessible it is not reasonable for all other disks in the cascade to become inaccessible because this is contrary to the user's view of the copies being made. There is no reason for the user to assume the target disks are linked.

Therefore there is a need to provide a solution that localizes an impact of a failure to a target disk in an affected segment.

SUMMARY OF THE INVENTION

In one aspect of the invention, a storage controller is provided. The storage controller includes a host write component operable to write a data object to a source data image at one of a plurality of controlled storage apparatus. A first copy component is also provided. The first copy component is responsive to a first metadata state and operable to control copying of the data object to a first target data image at one of the controlled storage apparatus. A second copy component is also provided in which the second copy component is responsive to a second metadata state and operable to perform one of the following: controlling copying of the data object to a second target data image at one of the controlled storage apparatus, or causing the first copy component to perform copying of the second target data image to the first target data image. In addition, a third copy component is provided to control cascaded copying of the data object to a third target data image at one of the controlled storage apparatus. One of the second and third copy components is operable to control cascaded copying of a delimited subsequence of data images responsive to a third metadata state indicating currency of a grain of data in one of the second and third target data images.

In yet another aspect of the invention, a computer program product is provided with a computer useable medium having computer useable program code for operating a storage controller. The program includes computer useable code for a host write component to write a data object to a source data image at one of the controlled storage apparatus, computer useable code for copying by a first copy component the data object to a first target data image at one of the controlled storage apparatus responsive to a first metadata state, and computer useable code, responsive to a second metadata state, for performing by a second copy component one of the following: controlled copying of the data object to a second target data image at one of the controlled storage apparatus, or causing the first copy component to perform copying of the second target data image to the first target data image. In addition, computer useable code is provided for cascaded copying by a third copy component of the data object to a third target image at one of the controlled storage apparatus.

In a further aspect of the invention, a tool is provided for managing a storage controller. The tool includes instructions for writing a data object to a source data image at one of a plurality of controlled storage apparatus. In addition, instructions are provided for copying the data object to a first target data image at one of the controlled storage apparatus in response to a first metadata state, and instructions responsive to a second metadata state are provided for performing one of the following: controlled copying of the data object to a second target data image at one of the controlled storage apparatus, or copying of the second target data image to the first target data image. In addition, instructions are provided for cascaded copying by a third copy component the data object to a third target data image at one of the controlled storage apparatus. One of the second and third copy components is operable to control cascaded copying of a delimited subsequence of data images responsive to a third metadata state indicating currency of a grain of data in one of the second and third target data images.

Other features and advantages of this invention will become apparent from the following detailed description of the presently preferred embodiment of the invention, taken in conjunction with the accompanying drawings.

BRIEF DESCRIPTION OF THE DRAWINGS

The present invention will now be described by way of example only, with reference to the accompanying drawings, in which.

DETAILED DESCRIPTION OF THE PREFERRED EMBODIMENTS

Figure 1:
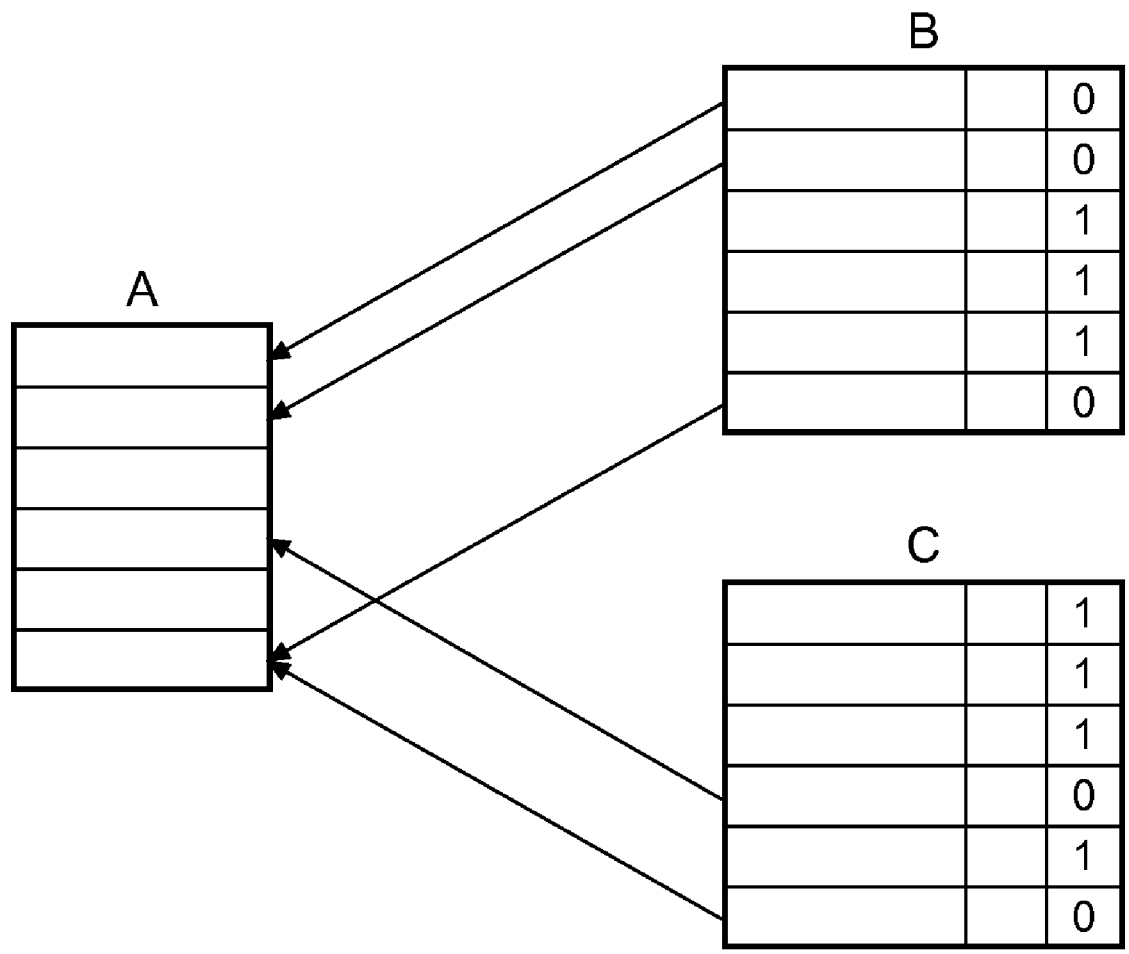
FIG. 1 shows a prior art data arrangement having multiple parallel targets.

In FIG. 1 is shown a prior art data arrangement having multiple parallel targets. In an alternative, there may be provided a system, method or computer program in which host I/O activity is bounded, but cascaded copies of data are propagated to future targets without the need for host intervention. Such an arrangement may be further refined using the certain embodiments of the present invention.

Figure 2A:
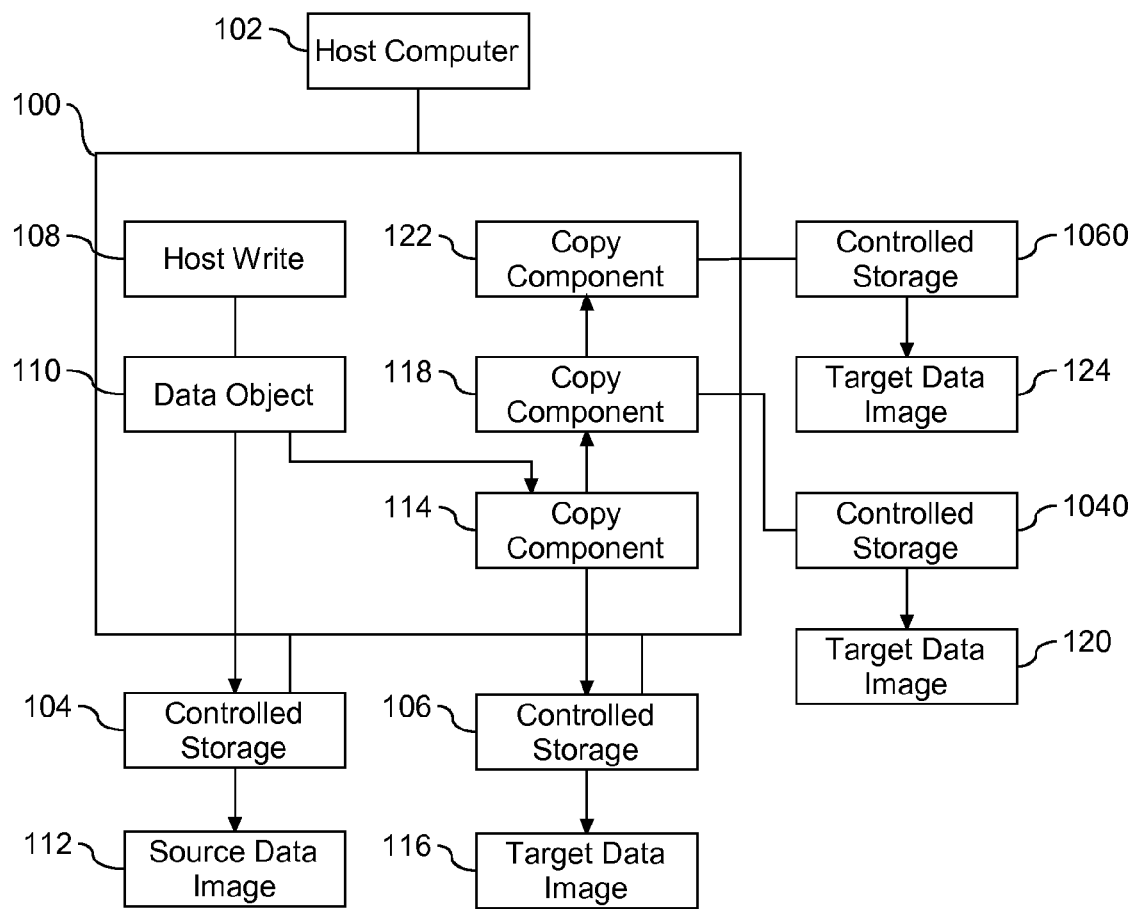
FIG. 2a is a schematic diagram illustrating a storage controller structure in which a cascade arrangement may be incorporated.

Turning now to FIG. 2a, there is shown a simplified schematic diagram of a storage controller in which one embodiment of the present invention may be implemented.

In FIG. 2a is shown a storage controller 100, cooperable with host computer apparatus 102, and a plurality of controlled storage apparatus 104, 106, 1040, 1060, and comprising: a host write component 108 operable to write a data object 110 to a source data image 112 at one of said plurality of controlled storage apparatus 104, 106, 1040, 1060; a first copy component 114 responsive to a first metadata state and operable to control copying of said data object 110 to a first target data image 116 at one of said plurality of controlled storage apparatus 104, 106, 1040, 1060; a second copy component 118 responsive to a second metadata state and operable to perform one of: controlling copying of said data object 110 to a second target data image 120 at one of said plurality of controlled storage apparatus 104, 106, 1040, 1060; and causing said first copy component 114 to perform copying of said second target data image 120 to said first target data image 116; wherein said controlling copying and performing copying is independent of said host computer apparatus 102 and said host write component 108; a third copy component 122 operable to control cascaded copying of said data object 110 to a third target data image 124 at one of said plurality of controlled storage apparatus 104, 106, 1040, 1060, independently of said host computer apparatus 102, said host write component 108 and said first and second copy components 114, 118; wherein one of said second and said third copy components 114, 122, is operable to control cascaded copying of a delimited subsequence of data images responsive to a third metadata state indicating currency of a grain of data in one of said second and said third target data images 120, 124.

Figure 2B:
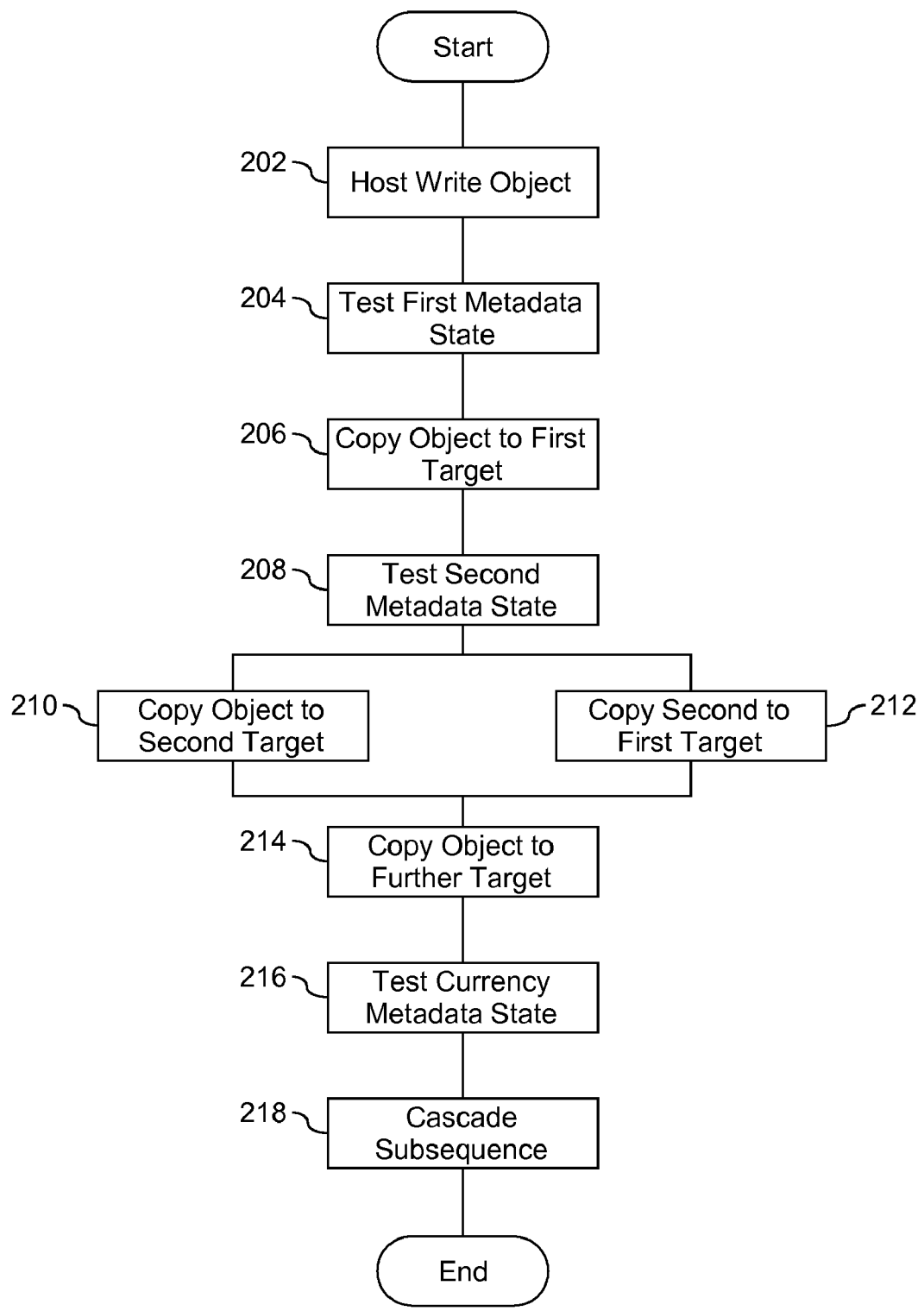
FIG. 2b is a flowchart illustrating a method of operation of storage controller according to one embodiment of the present invention, and is suggested for printing on the first page of the issued patent.

In FIG. 2b is shown a flow diagram illustrating a method for operating a storage controller, cooperable with host computer apparatus, and a plurality of controlled storage apparatus.

At step 202, a host write component writes a data object to a source data image at one of the plurality of controlled storage apparatus. At step 204, a first copy component tests a metadata state, and responsive thereto, copies, at step 206, the data object to a first target data image at one of the plurality of controlled storage apparatus. At step 208, a second copy component tests a second metadata state, and responsive thereto, either performs, at step 210, a step of copying the data object to a second target data image at one of the plurality of controlled storage apparatus or, at step 212, causes the first copy component to perform copying of said second target data image to said first target data image. The steps of testing and performing copying are independent of the host computer apparatus and said host write component. At step 214 a third copy component is in control of copying the data object to a third target data image at one of the plurality of controlled storage apparatus independently of the host computer apparatus, the host write component and the first and second copy components; and one of the second or third copy components is operable to control cascaded copying at step 218 of a delimited subsequence of data images responsive to a third metadata state test at step 216 indicating currency of a grain of data in one of the second and the third target data images.

Below are given two possible embodiments of the present invention that would maintain the required copies of original data.

Before describing these embodiments the concept of a "grain subsequence" needs to be explained. A grain subsequence is a sequence of grains on consecutive disks associated with the same original data at a particular point in time.

The first implementation is to consider the type of data that can be on disk in the cascade at any point in time. There are four types of data that are of interest:

1) Blank Data (BD): Data that existed on a target disk prior to the flash copy being started.

2) Original Data (OD): Data that existed on the source disk at the point the flash copy was started.

3) New Data (ND): Data that was written to disk in a cascade after the flash copy has been started.

4) Delimiting Data (DD): The most upstream occurrence of original data.

The fact the data can be classified as four types means that each grain can be represented by 2 bits. Thus for each virtual disk in the cascade only two bitmaps are required. Note that this only needs one bitmap for the source disk because the data can only be DD or ND. In fact, the source does not need any bitmaps because its state can be inferred from the target disks. However, with the one bitmap the condition of the source can be ascertained by checking a single bit instead of having to checking several bitmaps by working down the cascade. Thus, the expense of a bitmap seems justified. Also, the usual split bitmap that is associated with the mapping between the source and the target disk is no longer required.

Now additional rules to the usual ones for cascaded FC can be provided:

A1) When a new sequence of disks is started in a cascade all the grains on the source are set to DD.

A2) If a write is made to a grain on a disk which is OD the data held on the grain is written to N disks upstream or downstream whose corresponding grain is BD and provided it does not require crossing a disk whose grain is type DD.

A3) If a write is made to a grain on a disk which is DD the data held on the grain is written to N disks downstream whose corresponding grain is BD including the next downstream disk that is BD and provided it does not require crossing a disk whose grain is type DD. Then the most upstream disk that contains OD and does not cross the disk written too is reclassified as DD.

If a disk becomes inaccessible the following recovery actions are carried out before the cascade is protected from a second failure:

B1) For each grain, count the number of occurrences of DD and OD between disks which are DD. If the number is less than the minimum number required, perform the appropriate number of writes as described in (A2) and (A3) above. This can be done because there is at least one other copy of DD or OD in the cascade.

B2) For each grain on the inaccessible disk if the data was DD find the next downstream disk that is OD and set the grain on that disk to DD.

In addition to having multiple copies preserved in the cascade another benefit of this implementation is that the rule for a target write can be simplified to:

D1) If the data held on the grain is type BD and writing a full grain of data then simply write the new data and mark the grain as ND.

D2) If the data held on the grain is type BD and writing a partial grain of data then read the original data from the nearest copy, merge with the new data and write the merged data, then mark the grain as ND.

Thus, in D2 this implementation saves an additional write.

The second embodiment works by associating two new bitmaps with each disk in the cascade. The first bitmap, called the original bitmap, will be used to indicate whether a particular grain holds the original data for that grain from when that part of the cascade was started. The second bitmap, called the delimiter bitmap, is used to indicate that a particular grain is the first disk to hold a grain from the grain subsequence.

Using these bitmaps, plus the usual split bitmaps, the following rules are introduced in addition to the usual rules for a cascaded flash copy mapping:

A1) When a new sequence of disks is started in a cascade the original and delimiter bitmaps associated with the source are set to all 1's.

A2) If a write is made to a grain on a disk for which the original bitmap indicates the grain holds original data but does not have the delimiter bit set then the original data is written to N disks upstream or downstream that have not been split and provided it does not require crossing a disk which has the delimiter bit set for that grain.

A3) If a write is made to a grain on a disk for which the original bitmap indicates the grain holds original data and has the delimiter bit set then the original data is written to N disks downstream that have not been split and provided it does not require crossing a disk which has the delimiter bit set for that grain, and the disks written to must include the next disk downstream that satisfies these criteria.

Similar rules for recovery can be inferred by one of ordinary skill in the art for this implementation.

The following examples demonstrate how the rules for the above implementations ensure that the cascade can cope with a single failure. In both examples it is assumed that (N=) 2 copies of the original data must be maintained when the original data is moved off the source disk.

First it will be shown how the first implementation works. Then, using an identical setup, it will be shown how the second implementation works.

EXAMPLE 1

Implementation 1

Figure 3A:
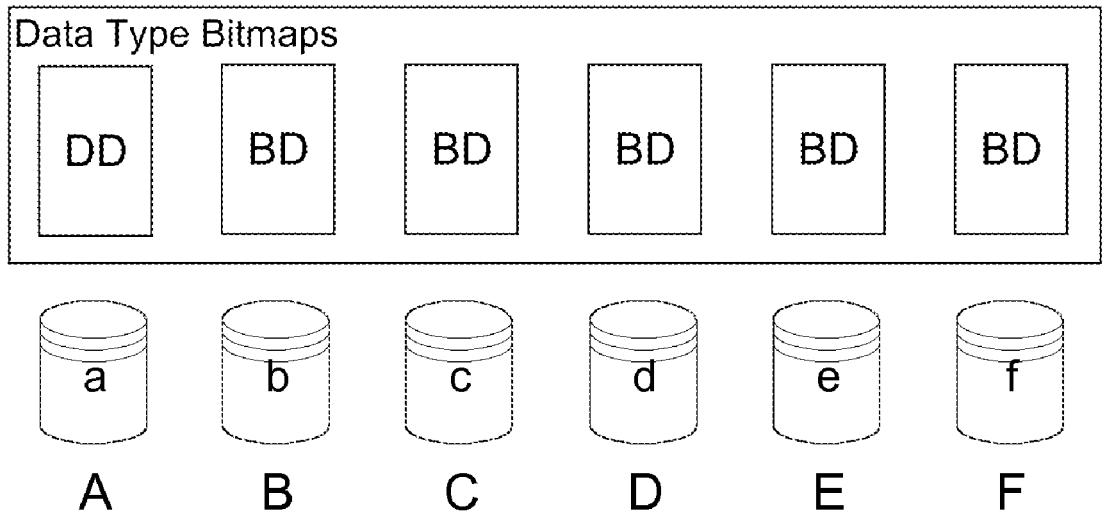
FIGS. 3 to 8 show the effects of the operation of the present invention on a network of storage devices.

In FIG. 3a there is shown a cascade of six disks (A,B,C,D,E and F) each with 1 grain represented by a,b,c,d,e and f respectively. Using these bitmaps whenever a write is made to a grain of original data, two writes are made to ensure that, if the original data is moved from the source disk, at least two copies of the original grain are in the cascade at any one time.

Figure 3B:
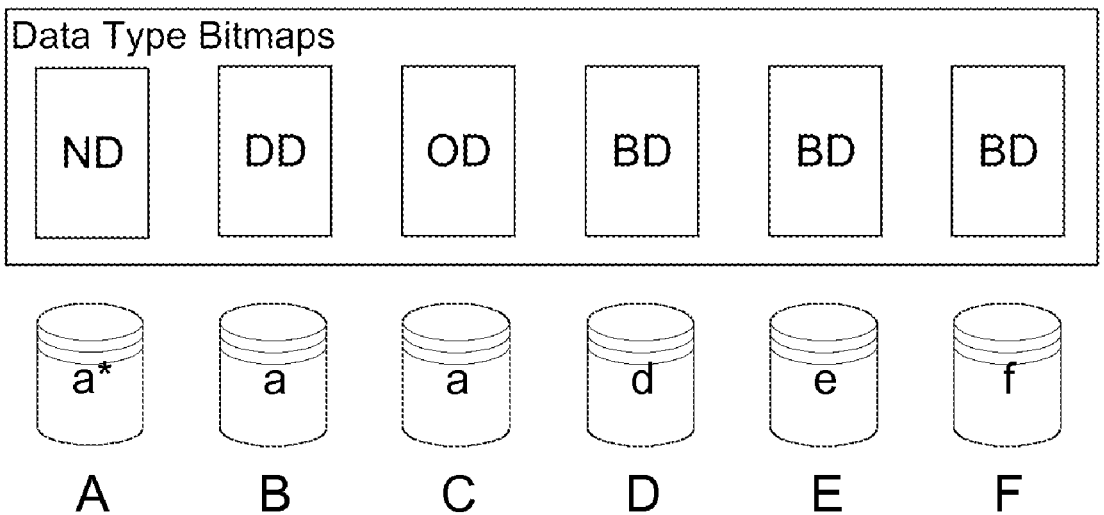

Thus if there is a write to disk A with a grain's worth of data represented by a*, the situation described in FIG. 3b arises. Since disk A contains new data, the bitmaps are set to ND. The original data is now held on disks B and C and the most upstream original data is held on B. Thus the bitmaps for these disks are set to DD and OD respectively.

Figure 7A:
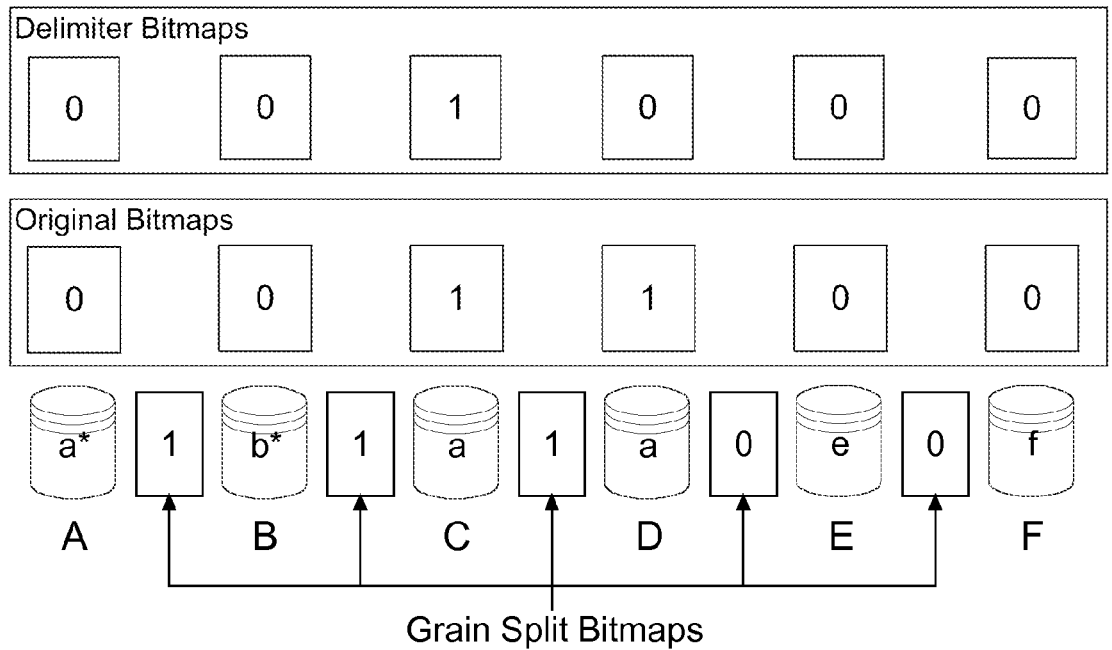

If there is now a write to any grain that is set to DD or OD, there is a need to make two subsequent writes in order to maintain the number of original copies held in the cascade. For example if there is a write to B with data represented by b*, the situation described in FIG. 7a arises. Since B no longer contains original data the bitmaps are set to ND. Disk C now contains the most upstream disk with original data thus the bitmaps are set to DD and D now contains original data therefore the bitmaps are set to OD. Now if any one disk becomes inaccessible all other disks in the cascade remain accessible because they can access the data required.

Figure 7B:
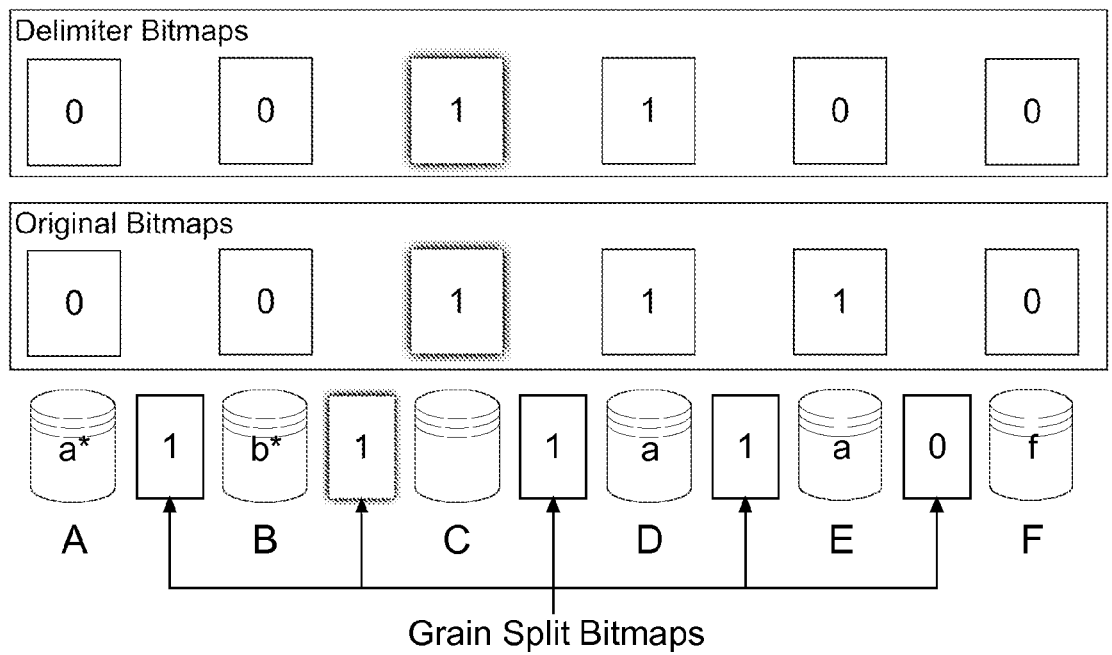

If disk C becomes inaccessible, then using the recovery action described above, the situation shown in FIG. 7b arises. Disk D now contains original data and is the most upstream example of original data thus is set to DD. The original data held on D is copied to E which is set to OD.

Figure 6:
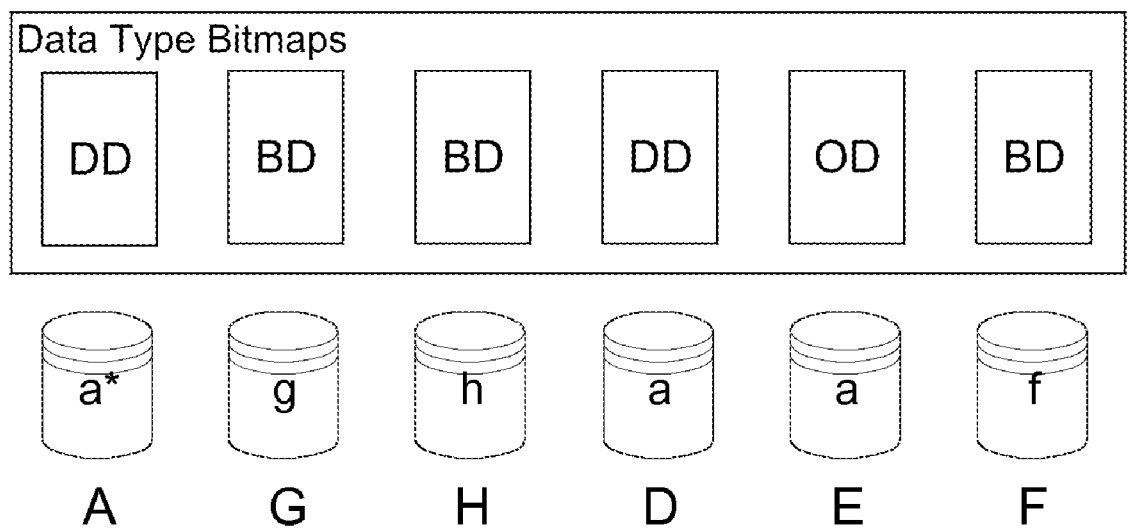

Now if disks G and H are added, each with one grain of data represented by g and h respectively, using the rules above the situation described in FIG. 6 arises. Now because A contains the original data for G and H the data type bitmaps are set to DD. Now there are two grain subsequences in the cascade. That is, the grains held on A,G,H and those held on D,E,F. These grain subsequences have different original data, which is indicated by A and D being of type DD. When maintaining a minimum number of occurrences of the original data is a concern, these subsequences must be treated as independent cascades.

This example shows that the original bitmap and the rules described ensure that if the original grain's data is removed from the original source, multiple copies of the original data are maintained.

EXAMPLE 2

Implementation 2

Figure 4A:
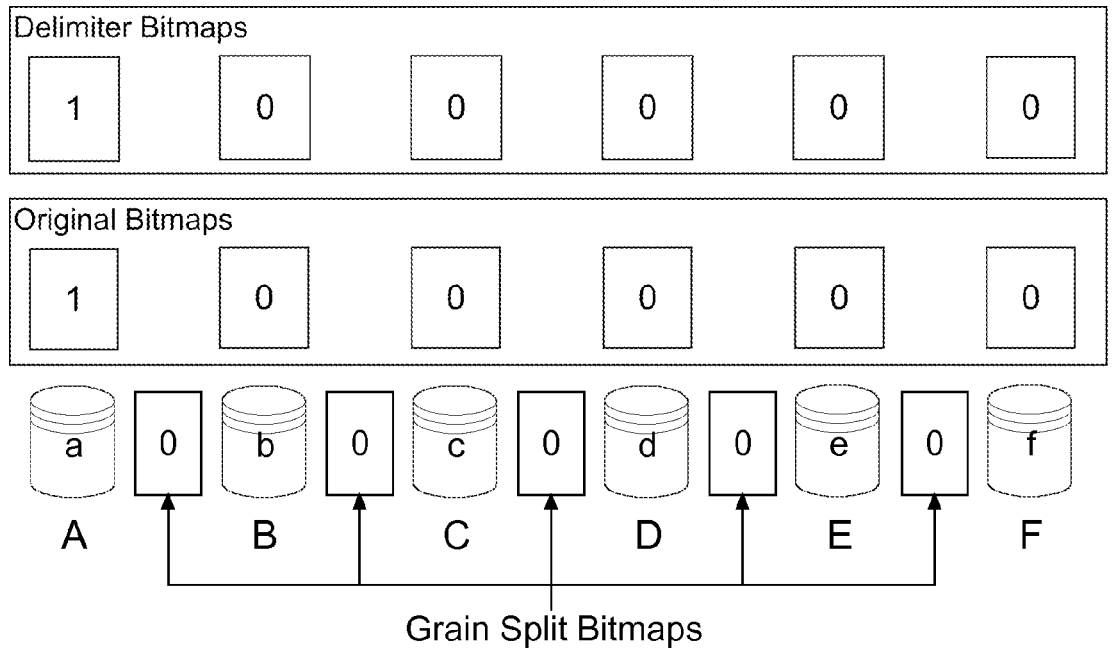
Figure 4B:
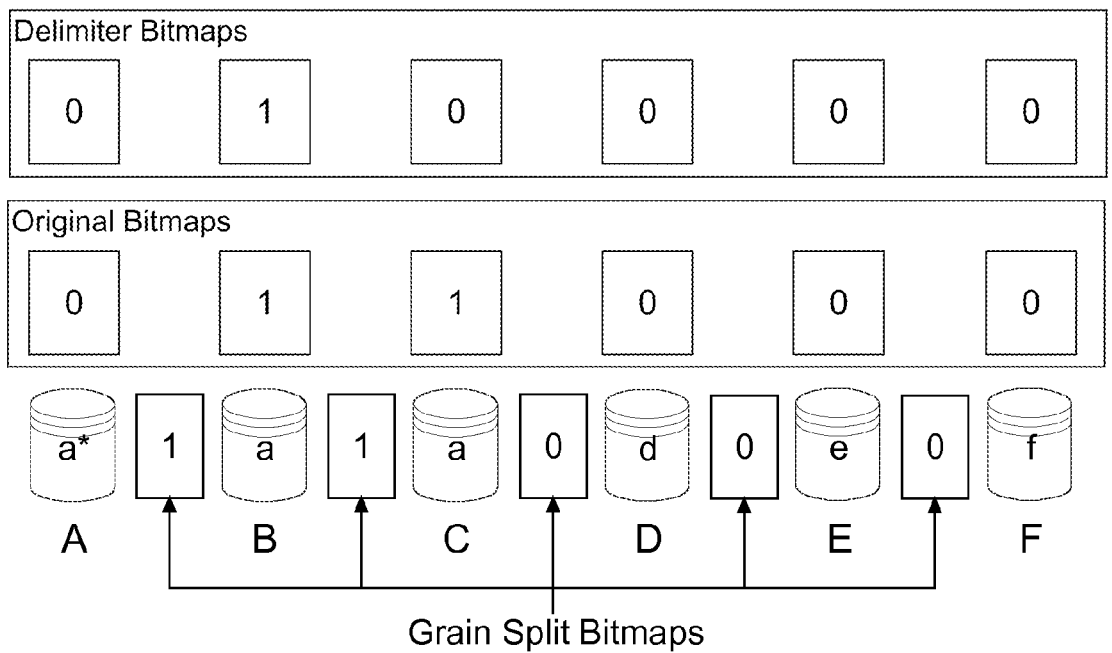
Figure 5A:
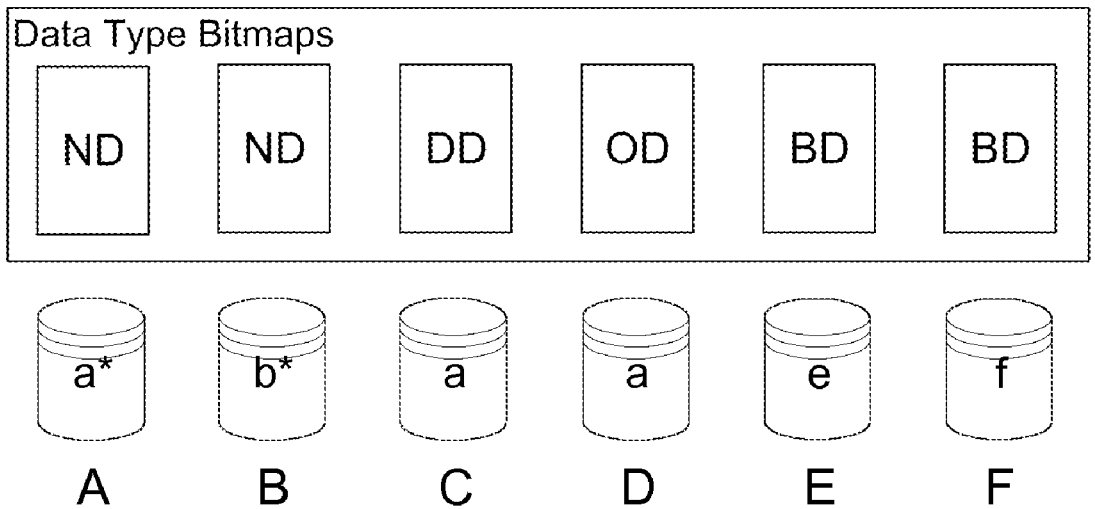
Figure 5B:
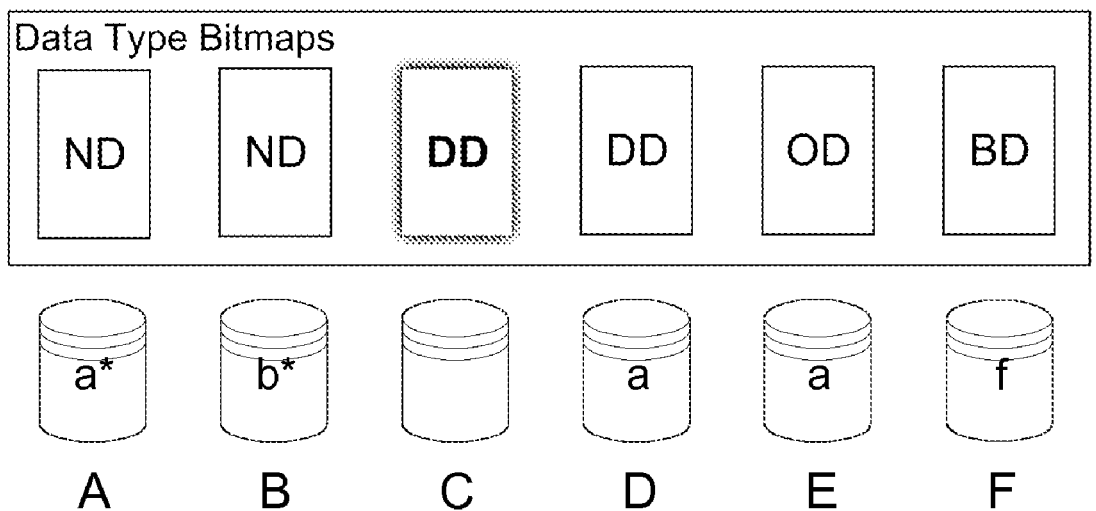

In FIG. 4a below there is shown a cascade of six disks (A,B,C,D,E and F) each with 1 grain represented by a,b,c,d,e and f respectively. Using these bitmaps whenever a write is made to a grain of original data, two writes are made to ensure that, if the original data is moved from the source disk, at least two copies of the original grain are in the cascade at any one time. Thus if there is a write to disk A with a grain's worth of data represented by a*, the situation described in FIG. 4b arises. Since disk A no longer contains original data, the delimiter and original bitmaps are set to 0. The original data is now held on disks B and C and the most upstream original data is held on B. Thus the bits in the original bitmaps for B and C are set to 1 and the bit for the delimiter bitmap of B is also set to 1.

If there is now a write to any grain that contains original data, there is a need to make two subsequent writes in order to maintain the number of original copies held in the cascade. For example, if there is a write to B with data represented by b*, the situation described in FIG. 7a arises. Since B no longer contains original data, the original and delimiter bitmaps are set to 0. Disk C now contains the most upstream disk with original data the delimiter bitmap is set to 1, and D now contains original data therefore its original bitmap is set to 1. Now if any one disk becomes inaccessible all the disks in the cascade remain accessible because they can access the data required.

If disk C becomes inaccessible, then using the discovery action described above, the situation shown in FIG. 7b arises. Disk D now contains original data and is the most upstream example of original data, and thus its delimiter bit is set. The original data held on D is copied to E and the original bit is set.

Figure 8:
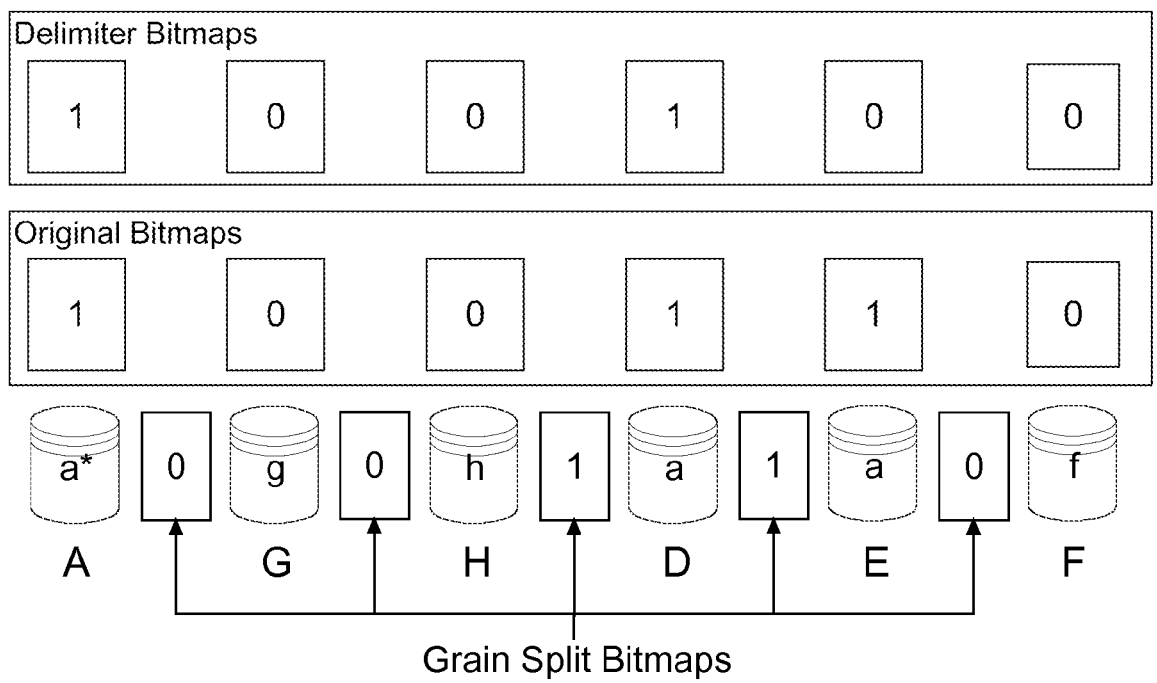

Now if disks G and H are added, each with one grain of data represented by g and h respectively, using the rules above the situation described in FIG. 8 arises. Now because A contains the original data for G and H the original bit for A and the delimiter bit for A is set to 1. Now there are two grain subsequences in the cascade. That is, the grains held on A,G,H and those held on D,E,F. These grain subsequences have different original data which is indicated by the delimiter bits being set. When maintaining a minimum number of occurrences of the original data is a concern, these subsequences must be treated as independent cascades.

This example shows that the original bitmap and the rules described ensure that if the original grain's data is removed from the original source, multiple copies of the original data continue to exist. The delimiter bitmap enables multiple copies of the original data for multiple grain subsequences to be maintained.

Certain embodiments of the present invention provide that if data is removed from the source disk of the cascade, in the majority of cases the data will be maintained on a number of downstream disks. The number of copies (N) of the data can be chosen from within the range N=2 to (number of disks in the cascade—1). In this way it is guaranteed that if up to N−1 disks in the cascade (excluding the source of the cascade which is treated differently) become inaccessible the data for all the disks in the cascade can be extracted from the other disks. When a disk becomes inaccessible a recovery procedure will be activated which will ensure that within the cascade multiple copies of the data will be held on the remaining disks. Thus provided too many multiple failures are not experienced in quick succession the cascade will still cope with a disk failure.

An alternative to always writing the same number of copies of original data would be to count the number of original copies in the grain subsequence before deciding on the number of copies that need to be written. This method need not be described here because it will be clear to one of ordinary skill in the art that this requires only a simple change to the above rules and example.

Another improvement that could be made would be to introduce "fence post disks". These disks would be more reliable than the other disks in the cascade and would serve to break up long cascades. When additional writes are made, these disks would be chosen before the other disks, except that rule A3 must remain the same. In this way data would be stored on the most reliable disks in the cascade.

Thus, the problem is ameliorated in the present invention by running a background copy at intervals in a long chain of cascaded data copies. This breaks the chain into independent segments, which thus advantageously localises the impact of a failure to just those targets in the particular affected segment.

It will be readily appreciated by one of ordinary skill in the art that various further modifications to the embodiment described above will be apparent to a person of ordinary skill in the art.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It will also be appreciated that various further modifications to the embodiment(s) described above will be apparent to a person of ordinary skill in the art.

We claim:

1. A storage controller comprising:
a host write component operable to write a data object to a source data image at one of a plurality of controlled storage apparatus;
a first copy component responsive to a first metadata state and operable to control copying of said data object to a first target data image at one of said plurality of controlled storage apparatus;
a second copy component responsive to a second metadata state and operable to perform a step selected from a group consisting of:
controlling copying of said data object to a second target data image at one of said plurality of controlled storage apparatus; and
causing said first copy component to perform copying of said second target data image to said first target data image;
a third copy component operable to control cascaded copying of said data object to a third target data image at one of said plurality of controlled storage apparatus; wherein one of said second and said third copy components is operable to control cascaded copying of a delimited subsequence of data images responsive to a third metadata state indicating currency of a grain of data in one of said second and said third target data images; and
wherein for each grain removed from a source storage apparatus a predetermined number of copies is preserved in the cascade.

2. The storage controller of claim 1, wherein the storage controller is incorporated in a storage network.

3. The storage controller of claim 2, wherein the storage network is a storage area network.

4. The storage controller of claim 2, wherein at least one of the first and the second copy components and the third copy component is located at different nodes of a communications network.

5. The storage controller of claim 1, wherein at least one of the first and the second copy components is located at a different node of a communications network.

6. A computer program product comprising:
a computer useable storage medium having computer useable program code for operating a storage controller, said computer program product including:
computer useable code for a host write component to write a data object to a source data image at one of a plurality of controlled storage apparatus;
computer useable code for copying by a first copy component said data object to a first target data image at one of said plurality of controlled storage apparatus responsive to a first metadata state; and
computer useable code, responsive to a second metadata state, for performing by a second copy component a step selected from a group consisting of:
controlled copying of said data object to a second target data image at one of said plurality of controlled storage apparatus; and
causing said first copy component to perform copying of said second target data image to said first target data image; and
computer useable code for cascaded copying by a third copy component said data object to a third target image at one of said plurality of controlled storage apparatus, wherein for each grain removed from a source storage apparatus a predetermined number of copies is preserved in the cascade.

7. The computer program product of claim 6, wherein the storage controller is incorporated in a storage network.

8. The computer program product of claim 7, wherein the storage network is a storage area network.

9. The computer program product of claim 6, wherein at least one of the first and second copy components is located at a different node of a communication network.

10. The computer program product of claim 6, wherein at least one of the first and second copy components and the third copy component is located at different nodes of a communications network.

11. The computer program product of claim 6, wherein said first and second copy components perform said controlled copying independent of said host computer apparatus and said host write component.

12. The computer program product of claim 6, wherein said third copy component is operable independent of said host computer apparatus, said host write component, and said first and second copy components.

13. A tool for managing a storage controller comprising:
instructions for writing a data object to a source data image at one of a plurality of controlled storage apparatus;
instructions for copying said data object to a first target data image at one of said plurality of controlled storage apparatus, wherein said instructions are responsive to a first metadata state;
instructions responsive to a second metadata state for performing a step selected from a group consisting of:
controlled copying of said data object to a second target data image at one of said plurality of controlled storage apparatus, and
copying of said second target data image to said first target data image;
instructions for cascaded copying by a third copy component said data object to a third target data image at one of said plurality of controlled storage apparatus, wherein one of said second and third copy components is operable to control cascaded copying of a delimited subsequence of data images responsive to a third metadata state indicating currency of a grain of data in one of said second and third target data images, wherein for each grain removed from a source storage apparatus a predetermined number of copies is preserved in the cascade.

14. The storage controller of claim 1, wherein prior to making a write to a grain containing original data the predetermined number of copies of said grain is made, wherein each of said copies is preserved on a separate storage apparatus.

15. The storage controller of claim 1, wherein said cascade includes multiple sequences of grains on consecutive storage apparatus, wherein each sequence is associated with the same original data at a particular point in time.

16. The storage controller of claim 1, further comprising performing a calculated number of writes in response to a storage apparatus failure to maintain said predetermined number of copies in the cascade, said writes containing copies of grains stores on the failed storage apparatus.

* * * * *